United States Patent [19]

Rabe

[11] 3,847,310

[45] Nov. 12, 1974

[54] ROLLING DIAPHRAGM FOR EXPELLING LIQUID FROM TAPERED TANKS

[75] Inventor: George B. Rabe, Sparta, N.J.

[73] Assignee: Thiokol Chemical Corporation, Bristol, Pa.

[22] Filed: Dec. 16, 1966

[21] Appl. No.: 602,419

[52] U.S. Cl. .......................................... 222/386.5
[51] Int. Cl. .............................................. B67d 5/54
[58] Field of Search .......... 222/95, 386.5; 158/50.1; 239/323

[56] References Cited
UNITED STATES PATENTS

| | | | |
|---|---|---|---|
| 3,112,845 | 12/1963 | Bryant | 222/386.5 X |
| 3,158,296 | 11/1964 | Cornelius | 222/386.5 |
| 3,162,328 | 12/1964 | Frume | 222/386.5 X |
| 3,321,112 | 5/1967 | Cunningham et al. | 222/386.5 |

Primary Examiner—Verlin R. Pendegrass

[57] ABSTRACT

Disclosure relates to a rolling diaphragm for expelling a liquid, such as a propellant for a rocket engine, from a tank of frusto-conical shape in which the diaphragm is of the same frusto-conical shape as the tank has a flange at the end of the larger diameter which is directed radially inward and connected to the periphery of a piston of smaller diameter and so constructed that longitudinal movement of the piston by fluid pressure applied to one side thereof draws the peripheral wall of the diaphragm inwardly as it is moved with the piston longitudinally to fold the diaphragm from a larger to a smaller diameter as it rolls along the wall of the tank.

7 Claims, 6 Drawing Figures

PATENTED NOV 12 1974
3,847,310
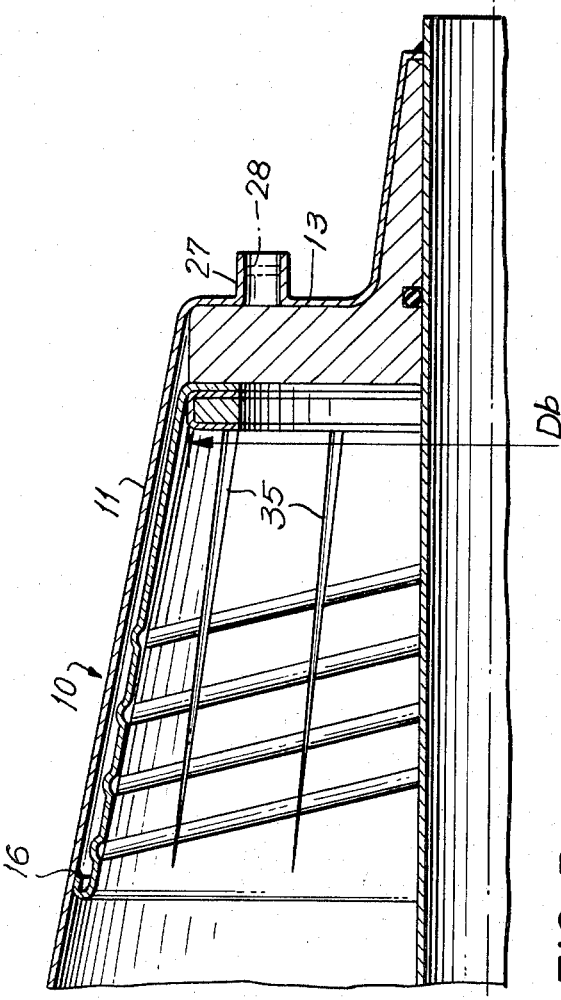
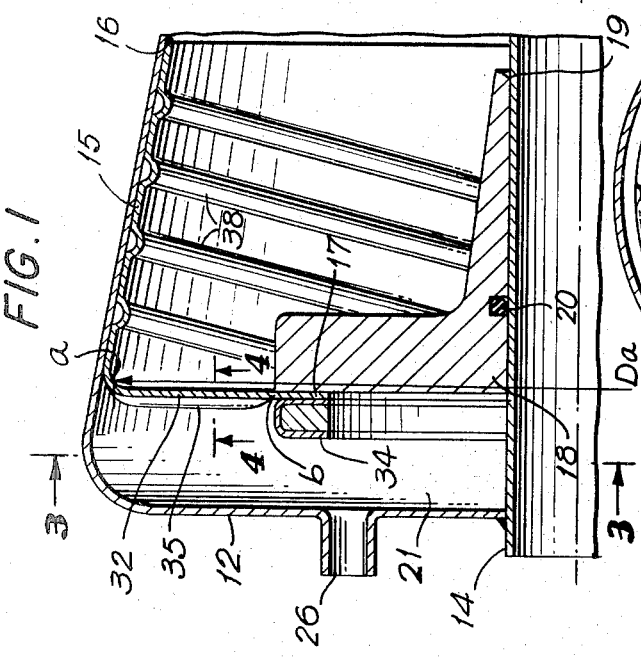
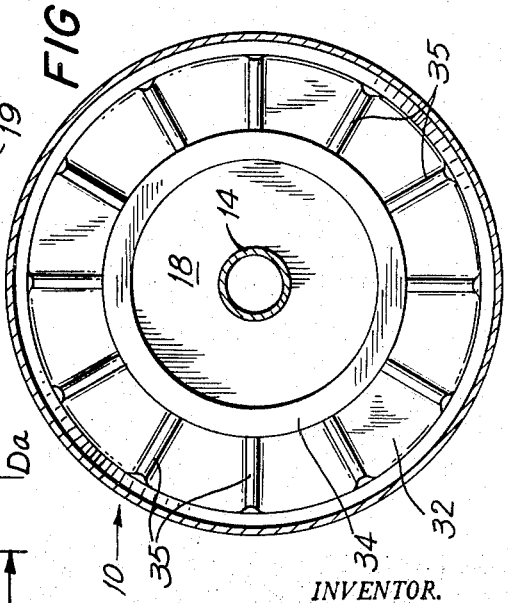
INVENTOR.
GEORGE B. RABE
BY
Curtis, Morris & Safford
ATTORNEYS

ROLLING DIAPHRAGM FOR EXPELLING LIQUID FROM TAPERED TANKS

The present invention relates to a positive displacement liquid expelling system for tanks and more particularly to improvements in rolling diaphragms which roll inside out in a tank to positively displace liquid therefrom.

Such rolling diaphragms have heretofore been used to positively expel a liquid propellant from a tank to the combustion chamber in a rocket engine. However, the use of such rolling diaphragms has been restricted by design limitations. For example, as the length and diameter of a rolling diaphragm is increased the total radial force acting on the diaphragm increases which tends to collapse or buckle the diaphragm. In order to prevent such lateral buckling, the walls of the diaphragm must be made thicker as the diameter and length increase which decreases the flexibility of the wall and its ability to roll. This, in turn, requires an increase in the pressure of the motive fluid to roll the diaphragm with a corresponding increase in the forces tending to produce lateral buckling.

One of the objects of the present invention is to provide a rolling diaphragm of improved construction which permits an increase in length and diameter of a rolling diaphragm, with a corresponding increase in the volume of liquid stored, without lateral buckling of the diaphragm.

Another object is to provide a rolling diaphragm of the type indicated which will be drawn inwardly to a smaller diameter as it rolls forwardly to adapt it for use in tapered tanks.

Still another object is to provide a rolling diaphragm construction which is of simple and compact construction, economical to manufacture and one which is reliable in operation to positively displace liquid from a tank.

These and other objects will become more apparent from the following description and drawing in which like reference characters denote like parts throughout the several views. It is to be expressly understood, however, that the drawing is for the purpose of illustration only and is not a definition of the limits of the invention, reference being had for this purpose to the appended claims.

In the drawing:

FIG. 1 is a sectional view of a portion of a tapered tank taken longitudinally thereof and showing the ribbed annular flange connecting the outer periphery of the rolling diaphragm to the piston;

FIG. 2 is a sectional view of the opposite end of the tapered tank and showing the diaphragm rolled inside out from a larger to a smaller diameter;

FIG. 3 is a sectional view taken on line 3—3 of FIG. 1 and showing the indented ribs extending radially in the flange to control the buckling which takes place between the piston and outer wall of the diaphragm during expulsion;

FIG. 4 is a transverse sectional view taken on line 4—4 of FIG. 1 to show how the radially extending ribs are impressed in the annular end flange of the rolling diaphragm and form initial grooves which are extended during a rolling operation;

FIG. 5 is a sectional view showing a modified construction in which the inner edge of the annular flange is clamped between the edge of a piston and collar; and FIG. 6 is a sectional view of another modified construction for fastening the edge of the diaphragm flange to the piston.

Referring now to the drawing, the present invention is shown applied to a tank 10 for storing a liquid, such as a propellant for a rocket engine. The tank 10 has an outer peripheral wall 11, end walls 12 and 13 and an axial tubular support 14. A rolling diaphragm in the form of a sleeve 15 has one end 16 attached to and hermetically sealed to the inside wall 11 of the tank as by brazing, welding, soldering, or the like. The opposite end 17 of the rolling diaphragm sleeve 15 is attached to the periphery of a piston 18 mounted to slide on the axial supporting tube 14.

The joint between the piston 18 and end 17 of the rolling diaphragm sleeve 15 provides a seal and an axial extension 19 of the piston has an O-ring 20 engaging the axial supporting tube 14 to seal liquid stored in the tank 10 at the right hand side of the piston 18 as viewed in FIG. 1 from the clearance space 21 between the left hand side of the piston and end wall 12 of the tank. End wall 12 of the tank 10 has an inlet port 26 through which a pressurizing fluid, such as gas from a gas generator, is introduced into the clearance space 21 to force the piston 18 along the tank 10 from the position illustrated in FIG. 1 to that illustrated in FIG. 2. The end wall 13 of the tank 10 has an outlet port 27 therein as shown in FIG. 2 with a burst disc 28 which is automatically ruptured by pressure transmitted from the motive fluid supplied through the inlet port 26 and transmitted through the piston 18 and liquid in the tank. Thus, when a pressurizing fluid is supplied to the clearance space 21 at the left hand side of the piston 18 as viewed in FIG. 1, it moves the piston to the right as viewed in FIG. 2 and rolls the diaphragm sleeve 15 inside out to displace the liquid in the tank and expel it through the outlet port 27. The tank 10 and rolling diaphragm 15 as thus far described are of conventional construction.

In accordance with the present invention the piston 18 and diaphragm 15 are so constructed and arranged as to draw the diaphragm inwardly as the piston moves forwardly to cause it to reduce in diameter during a rolling operation. For purposes of illustration, the invention is shown applied to a tank 10 of frusto-conical shape and the diaphragm reduces in diameter as it rolls forwardly from the larger diameter $Da$ at the larger end $a$ to the smaller diameter $Db$ at the smaller end as illustrated in FIGS. 1 and 2. A frusto-conical tank is desirable for the purpose of producing an aerodynamic shape which produces less drag than a cylindrical shape. It will be understood, however, that the construction of the present invention may be applied to tanks of cylindrical or other shapes where a reduction in diameter of the rolling diaphragm is desirable.

As shown in FIGS. 1 and 2 the diaphragm sleeve 15 is of conical shape to fit the conical wall 11 of tank 10 with its end 16 of smaller diameter attached to the tank wall around its entire periphery. The opposite end of the diaphragm sleeve 15 at the larger diameter is folded inwardly to provide an annular flange 32 normal to the axis of the conical tank and overlying the rearward face of the piston 18. The inner edge 17 of the inwardly directed annular flange 32 is clamped to the outer periphery of the piston 18 by a ring 34 which may be attached to the piston 18 by fasteners or the like to seal the joint therebetween.

Thus, the piston 18 has a considerably smaller diameter than the end a of the rolling diaphragm sleeve 15 at the outer periphery of the annular flange 32. In the illustrated embodiment the piston 18 has a diameter slightly less than the smallest diameter of the tank wall 11 so that it is free to slide along the axial support 14 from the position illustrated in FIG. 1 to that illustrated in FIG. 2.

The annular flange 32 is provided with indentations 35 in the form of ribs extending radially from the piston 18 to the outer periphery a at the end of sleeve 15 having the larger diameter as shown in FIG. 3. These ribs may be formed by crimping the extended end of the sheet material of the sleeve to form grooves of semicircular cross-section as shown in FIG. 4 and of progressively increasing depth toward the axis of the support 14, or the flange 32 may be spun and the radial ribs 35 impressed therein. In either case, the ribs 35 provide bosses projecting into the space 21 and grooves facing the liquid side. The radial ribs 35 control deformation of the annular flange 32 between the piston 18 and outer periphery of diaphragm sleeve 15 thereby causing the flange to buckle to a conical shape between the circular junction line a and b where the flange 32 joins the piston and sleeve and the least resistance to bending exists.

The diaphragm sleeve 15 also has ribs 38 impressed in and extending around its periphery to strengthen the sleeve against lateral buckling. Furthermore, as the length of the sleeve increases its diameter gradually decreases, due to its tapered form, which further reduces the force applied tending to buckle the sleeve radially inward. Thus, the construction provides a diaphragm having a relatively high resistance to buckling either in the flange 32 or along the peripheral sleeve 15 with a relative thin and flexible material such as aluminum sheet. Because of the resistance to lateral buckling, the diaphragm 15 may be made longer and of greater diameter without buckling and thereby increasing the volume of liquid which may be stored in the tank. One form of the invention now having been described in detail, the mode of operation is next explained.

For purposes of description let it be assumed that the space at the right of the piston 18 as viewed in FIG. 2 is filled with a liquid propellant and that the diaphragm sleeve 15 and piston 18 are in the position illustrated in FIG. 1. To operate the rolling diaphragm 15 a pressurizing medium, such as gas from a gas generator, is introduced through the inlet port 26 into the clearance space 21 between the piston 18 and end wall 12 of the tank 10. The pressure of the motive fluid acting through the piston 18 and liquid in the tank bursts the sealing disc 28 in the outlet port 27. The pressure of the motive fluid from the gas generator then actuates the piston 18 to the right from the position illustrated in FIG. 1 to that illustrated in FIG. 2 and positively displaces the liquid in front of it which is expelled through the outlet port 27.

As the piston 18 moves forwardly it carries the inner edge of the annular flange 32 forwardly which then acts as an annular disc and buckles forwardly from a circular line at the point a as the frustum of a cone. Such forward movement of the inner edge of the annular flange 32 and the inclination of the flange relative to the sleeve 15 will draw the outer periphery of the sleeve inwardly as it is pulled forwardly. To permit inward movement of the sleeve 15 at the outer diameter at circular line a, the material of the sleeve must be displaced. This occurs by an automatic crimping of the material of the flange at the outer periphery of the sleeve 15 into an extension of ribs 35 which is continuously formed in the annular flange 35 as it is drawn inwardly in the manner shown most clearly in FIG. 2. As a result, the end of the diaphragm sleeve 15 of greatest diameter $Da$, see FIG. 1, is reduced to the diameter $Db$ corresponding to the outer diameter of the piston 18, see FIG. 2, so that it can pass through the successive sections of the smaller diameter and actually roll into the position illustrated in FIG. 2 without any excessive sliding frictional contact which interferes with the proper operation of the diaphragm.

FIG. 5 shows a construction for clamping the inner edge 33a of the annular flange of 32a of a diaphragm 15a. In this construction the outer periphery of the piston 18a has a rearwardly projecting annular boss 40 over which the inner peripheral edge 33a of flange 32a seats. A collar 41 of L-shape form in cross-section then overlies the edge 33a of the flange 32a and the boss 40 of the piston 18a. Collar 41 is held in clamping position by a weld 43 and the joint between the edge 33a of the flange 32a and piston 18a may be sealed in any suitable way, as by brazing or soldering.

FIG. 6 illustrates a still further modified joint construction between the inner edge 33b of flange 32b and piston 18b. In this construction the forward face of the outer periphery of the piston 18b is recessed to form an annular seat 45 in which the edge 33b of the annular flange 32b rests. The edge 33b of the flange 32b shown is then hermetically sealed to the piston as by welding, brazing or soldering as illustrated at 46.

It will now be observed that the present invention provides an improved construction for a rolling diaphragm which permits a longer diaphragm with a greater diameter to be used without danger of lateral buckling than has heretofore been possible. It will still further be observed that the present invention provides an improved rolling diaphragm in which the outer periphery of the diaphragm is drawn inwardly to a smaller diameter as it rolls forwardly. It will still further be observed that the present invention provides an improved rolling diaphragm of the type indicated which is of simple and compact construction, economical to manufacture and one which is reliable in operation.

While a preferred embodiment of the invention and two forms of attaching means are herein shown and described, it will be understood that other changes may be made in the construction and arrangement of elements without departing from the spirit or scope of the invention. Therefore, without limitation in this respect, the invention is defined by the following claims:

I claim:

1. Apparatus for expelling liquid from a tank of the type comprising a rolling diaphragm in the form of a sleeve having one end attached to the wall of the tank and its opposite end attached to a piston with means for supplying a pressurizing fluid through an inlet port to actuate the piston along the tank and roll the diaphragm attached thereto and expel liquid from the tank through an outlet port, that improvements which comprises providing a piston of smaller diameter than the diameter of the tank, an annular flange at the end of the diaphragm extending radially inward toward and attached to the outer periphery of the piston, and said end flange having indentations therein in the form of ribs extending from the outer periphery of the piston to the outer periphery of the diaphragm to cause the flange to initially buckle forwardly when pressure is applied and draw the outer periphery of the diaphragm inwardly as the flange moves forwardly to control the rolling action of the diaphragm.

2. A rolling diaphragm for expelling liquid from a tank comprising a sleeve having one end attached to the wall of the tank, a piston attached to the opposite end of the diaphragm, an inlet port for supplying motive fluid to one side of the piston to cause it to move forwardly and roll the diaphragm back within itself, an outlet port through which the liquid in the tank is expelled during the rolling of the diaphragm, the end of said diaphragm adjacent the piston having a larger diameter than the end connected to the wall of the tank, the piston having a diameter less than the smallest diameter of the tank, a radial flange projecting inwardly from the end of the diaphragm to the periphery of the piston, and said radial flange having indentations therein to control the buckling of the flange between the diaphragm and piston as the piston moves forwardly and to draw the outer periphery of the diaphragm inwardly as it moves forwardly.

3. A rolling diaphragm in accordance with claim 2 in which the indentations are impressed in the flange and extend radially, and at least some of said impressed indentations providing starting creases for crimping the material of the diaphragm sleeve as it is drawn inwardly to displace the material as the sleeve decreases from a larger to a smaller diameter.

4. A rolling diaphragm in accordance with claim 2 in which the sleeve has ribs extending around its periphery to stiffen the sleeve against radial collapse, and the indentations in the end flange forming stiffening ribs extending radially to resist buckling between the piston and sleeve whereby to cause the end flange to buckle as a unit as the piston moves forwardly, and the peripheral ribs facilitating the inward movement of the diaphragm as it is drawn forwardly by the end flange.

5. A rolling diaphragm in accordance with claim 2 in which the diaphragm sleeve is conical, the piston is of less diameter than the smallest diameter of the diaphragm sleeve, and the radial flange connecting the end of the sleeve having the largest diameter and the periphery of the piston whereby to roll the diaphragm sleeve back on itself from a larger to a smaller diameter.

6. A rolling diaphragm in accordance with claim 2 in which the peripheral edge of the piston has an annular recess in which the inner edge of the radial flange seats, and means for attaching the inner edge of the flange to the piston.

7. A rolling diaphragm in accordance with claim 2 in which a collar is provided at the outer periphery of the piston and attached thereto, and the inner edge of the annular flange of the rolling diaphragm being clamped between the face of the piston and the collar.

* * * * *